(12) United States Patent
Wimmer

(10) Patent No.: US 9,230,422 B2
(45) Date of Patent: Jan. 5, 2016

(54) GENERATING SUM ALARMS IN PROCESS CONTROL

(71) Applicant: ABB Technology AG, Zurich (CH)

(72) Inventor: Wolfgang Wimmer, Rietheim (CH)

(73) Assignee: ABB TECHNOLOGY AG, Zürich (DE)

( * ) Notice: Subject to any disclaimer, the term of this patent is extended or adjusted under 35 U.S.C. 154(b) by 93 days.

(21) Appl. No.: 14/143,651

(22) Filed: Dec. 30, 2013

(65) Prior Publication Data

US 2014/0184405 A1    Jul. 3, 2014

Related U.S. Application Data

(63) Continuation of application No. PCT/EP2012/062812, filed on Jul. 2, 2012.

(30) Foreign Application Priority Data

Jun. 30, 2011    (EP) ...................... 11172189

(51) Int. Cl.
  *G08B 29/00*    (2006.01)
  *G08B 21/18*    (2006.01)
  *G05B 23/02*    (2006.01)

(52) U.S. Cl.
  CPC .......... *G08B 21/182* (2013.01); *G05B 23/0208* (2013.01); *G05B 23/0272* (2013.01)

(58) Field of Classification Search
  CPC .................................................. G05B 23/0267
  USPC ............ 340/506, 507, 517, 521, 524; 700/83, 700/108; 800/288
  See application file for complete search history.

(56) References Cited

U.S. PATENT DOCUMENTS

| | | | |
|---|---|---|---|
| 6,535,122 B1 * | 3/2003 | Bristol | 340/506 |
| 6,892,107 B2 * | 5/2005 | Baba et al. | 700/108 |
| 2003/0005486 A1 | 1/2003 | Ridolfo et al. | |
| 2004/0030429 A1 | 2/2004 | Baba et al. | |
| 2009/0216341 A1 | 8/2009 | Enkerud et al. | |
| 2010/0325304 A1 | 12/2010 | Wimmer | |

FOREIGN PATENT DOCUMENTS

| | | |
|---|---|---|
| EP | 1 331 536 A1 | 7/2003 |
| EP | 2 264 967 A1 | 12/2010 |
| WO | WO 2010/121671 A1 | 10/2010 |

OTHER PUBLICATIONS

International Search Report (PCT/ISA/210) mailed on Dec. 6, 2012, by the European Patent Office as the International Searching Authority for International Application No. PCT/EP2012/062812.
International Preliminary Report on Patentability (PCT/IPEA/409 issued on Jun. 12, 2013 by the European Patent Office as the International Searching Authority for International Application No. PCT/EP2012/062812.
European Search Report issued on Nov. 24, 2011.

\* cited by examiner

*Primary Examiner* — Toan N Pham
(74) *Attorney, Agent, or Firm* — Buchanan Ingersoll & Rooney PC

(57) ABSTRACT

A method and sum alarm server are disclosed, which generate a sum alarm for alarms of a process control system for an industrial plant. The method includes identifying alarms described by a configuration description for the industrial plant; assigning each identified alarm to a plant level; assigning each identified alarm to an alarm category based on an alarm type retrieved from the configuration description; and deriving a sum alarm per alarm category and at a selected plant level from all alarms assigned to the alarm category and assigned to the selected plant level or to any plant level below.

20 Claims, 2 Drawing Sheets

Connected OPC server    ABB.IEC61850_OPC_DA_Server.Instance[1]
  AA1.E1: REMGPRY4 132kV Q05: E05-TRAN
Q00: E00-TRAN
Q09: E09-TRAN
Q03: E03-TRAN
Q07: E07-TRAN
Q06: E06-TRAN

```xml
<Substation name="AA1" desc="REMGPRY4">
<VoltageLevel name="E1" desc="132kV" sxy:y="-8" sxy:x="0">
<Voltage multiplier="k" unit="V">132</Voltage>
<Bay name="Q05" desc="E05-TRAN" sxy:x="46" sxy:y="-16" sxy:dir="vertical">
<LNode iedName="AA1E1Q05A1" ldInst="LD0" lnClass="LLN0" lnInst=""></LNode>
<ConductingEquipment name="T2" desc="A1-REC670" type="CTR" sxy:x="2" sxy:y="21" sxy:dir="vertical">
<LNode iedName="AA1E1Q00A1" ldInst="LD0" prefix="SP16" lnClass="GGIO" lnInst="14"></LNode>
<LNode iedName="AA1E1Q00A1" ldInst="LD0" prefix="SPC8" lnClass="GGIO" lnInst="3"></LNode>
<LNode iedName="AA1E1Q00A1" ldInst="LD0" prefix="TCM" lnClass="YLTC" lnInst="2"></LNode>
<LNode iedName="AA1E1Q00A1" ldInst="LD0" prefix="V" lnClass="MMXU" lnInst="2"></LNode>
</ConductingEquipment>
<ConductingEquipment name="QA1" desc="Q0" type="CBR" sxy:x="-1" sxy:y="12" sxy:dir="vertical">
<LNode iedName="AA1E1Q05A1" ldInst="LD0" prefix="S" lnClass="CILO" lnInst="1"></LNode>
<LNode iedName="AA1E1Q05A1" ldInst="LD0" prefix="S" lnClass="CSWI" lnInst="1"></LNode>
<LNode iedName="AA1E1Q05A1" ldInst="LD0" prefix="S" lnClass="XCBR" lnInst="1"></LNode>
<Terminal cNodeName="{9A59E779-C626-416E-83AE-FA6E47A8003F}" substationName="AA1" connectivityNode="AA1/E1/Q05/{9A59E779-C626-416E-83AE-FA6E47A8003F}" bayName="Q05" voltageLevelName="E1"></Terminal>
<Terminal cNodeName="{520E13CA-9C82-432E-B2F2-7B56FF198612}" substationName="AA1" connectivityNode="AA1/E1/Q05/{520E13CA-9C82-432E-B2F2-7B56FF198612}" bayName="Q05" voltageLevelName="E1"></Terminal>
</ConductingEquipment>
```

Fig. 4

GENERATING SUM ALARMS IN PROCESS CONTROL

RELATED APPLICATION(S)

This application claims priority as a continuation application under 35 U.S.C. §120 to PCT/EP2012/062812, which was filed as an International Application on Jul. 2, 2012, designating the U.S., and which claims priority to European Application No. 11172189.0 filed on Jun. 30, 2011. The entire contents of these applications are hereby incorporated by reference in their entireties.

FIELD

The disclosure relates to Industrial Automation and Control Systems, for example, to Substation Automation systems, with a standardized configuration representation, and for example, to a method of presenting alarms of the system to an operator.

BACKGROUND INFORMATION

Substation Automation ("SA") systems can supervise, monitor, protect and control the substation. This can be done by protection and control devices allocated to the substation bays and primary equipment, and station level gateways and Human Machine Interfaces ("HMIs"). The applications at station level can be configured according to the substation layout and the specifications of the customer respective the operator.

Protection and control devices of the SA system close to the process can generate events, warnings and alarm signals which can be sent to the station level devices for logging, archiving and evaluation. In case of disturbances, for example, an operator in charge has to investigate what has happened when and at which location in the system, based on the available information. For this purpose alarm evaluation applications can provide some sort of support to the operator.

Filters configurable according to alarm and event lists to filter out certain aspects can be used, for example, alarms of a bay, a specific switch or transformer, or a specific secondary equipment device or function. These filters can rely on the limited information available in the event and alarm lists like the names of the objects at which the alarm happened. Filter category properties like priorities, alarm classes etc., which can be engineered for each signal or signal type can also be used.

The system alarm state can include sum alarms at different hierarchical levels, which can allow an identification of the location or function of the switch yard or secondary system where the problem has occurred. This can include manually pre-engineered alarm hierarchies according to switch yard structure and different functional categories like switch yard, protection, control, communication system, with sum alarms defined according to the switch yard structure, for example, at substation, voltage level, bay and equipment level. Such hierarchical alarm structure can enable the operator to gain an overview on the alarm situation at a higher level and to proceed downwards to the interesting lower levels, however, the hierarchical alarm structure can be configured individually for each substation at signal or signal type level, for example, for each alarm signal, the assignment of the functional category can be performed manually.

For example, SA systems based on IEC 61850 can be configured and described by means of a standardized configuration representation or formal system description called Substation Configuration Description (SCD). For example, an SCD file can include the logical data flow between the IEDs and the relation between the IEDs as well as the functionality which the IEDs can execute on behalf of the substation. In addition to SA systems for substations in high and medium-voltage power networks, other process control systems for, for example, hydro power plants, wind power systems, and Distributed Energy Resources (DER), can be described by a formal system description at least partly identical to the IEC 61850 SA description.

EP-A 2264967 is an interface description or structure of an inter-bay SA application. The interface of the application to other elements of the SA system, for example, to a bay controller, IED, OPC server, HMI, and/or gateway, can be used in order to fully automate inter-bay SA application configuration and implementation. A formal description or structure of the base SA system as for example, included in an IEC 61850 SCD file can be used to generate a formal description of the interfaces of the inter-bay SA application to be engineered, for example, to structure the interface data into Logical Nodes according to IEC 61850. The structure of the base SA system can be connected to the process single line diagram and integrated into the SCD file of the base SA system, thereby generating an enhanced SCD file. The interface-level Logical Nodes can include control blocks and data set definitions that together define the data flow within the application, for example, the communication links between the IED that hosts the interface function block and the IED hosting a basic SA functionality assigned to substation constituents on a hierarchically lower level. For example, this data flow can be engineered automatically by a separate application engineering wizard, or a component of a system engineering tool.

SUMMARY

A method of generating a sum alarm for alarms of a process control system for an industrial plant is disclosed, the method comprising: identifying alarms described by a configuration description for the industrial plant; assigning each identified alarm to a plant level; assigning each identified alarm to an alarm category based on an alarm type retrieved from the configuration description; and deriving a sum alarm per alarm category and at a selected plant level from all alarms assigned to the alarm category and assigned to the selected plant level or to any plant level below.

A sum alarm server of a Process Control (PC) system is disclosed, wherein the sum alarm server is configured to: identify alarms described by a configuration description for the industrial plant; assign each identified alarm to a plant level; assign each identified alarm to an alarm category based on an alarm type retrieved from the configuration description; and derive a sum alarm per alarm category and at a selected plant level from all alarms assigned to the alarm category and assigned to the selected plant level or to any plant level below.

BRIEF DESCRIPTION OF THE DRAWINGS

In the following, exemplary embodiments will be described in greater detail with reference to the attached drawings, in which:

FIG. 4 shows an excerpt of an exemplary SCD file including the configuration part for the automatically generated application views depicted in FIG. 1, for example, the bay view for AA1E1Q05.

DETAILED DESCRIPTION

Figure 1:
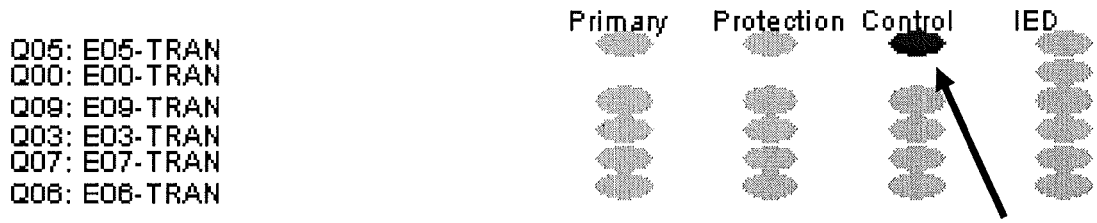
FIG. 1 shows a table view of an exemplary alarm hierarchy view at voltage level AA1E1 showing the alarm state of the bays.

In accordance with an exemplary embodiment, the disclosure can support the implementation of an alarm hierarchy and categorization for analysis of disturbances in an industrial plant or process, and for example, a method of generating a sum alarm and by an alarm interface.

According to the disclosure, alarms of a Process Control PC system for an industrial plant described by a standardized or formal system configuration description, for example, alarms of a Substation Automation SA system for a substation in a high or medium-voltage power network are embedded or consolidated, in an automated way, into a sum alarm for further processing or analysis. In accordance with an exemplary embodiment, alarms or other events can include immediate operator intervention, which can be identified and retrieved from the system configuration description and assigned to a plant or structural level according to the configuration description. For example, based on an alarm type, such as a Logical Node class and Data Object name according to IEC 61850, which can be retrieved from the system configuration description, and according to preconfigured or user-defined rules, each identified alarm can be assigned to an alarm category. Finally, for example, consolidated sum alarms at a particular plant level and per alarm category can be derived, or calculated, from all alarms assigned to the respective alarm category and all plant levels not hierarchically superior to the particular plant level.

For example, based on the formal system configuration description of a Process Control (PC) system of an industrial plant, can enable an automated generation of an alarm interface as part of a plant supervision process or of a Human Machine Interface. The alarm interface can include an alarm hierarchy according to plant level or process structure and an alarm categorization or classification according to pieces of equipment or process functions involved. For example, alarm categories in this context can be related to primary equipment or secondary equipment, or to protection, control, or security functions. In this context, the category assignment may be ambiguous as for example, a protection alarm may be assigned to both the "function" oriented category ("protection") and to the "equipment" oriented category ("transformer").

In an exemplary embodiment, a sum alarm acknowledgment can be defined for each implemented sum alarm. The corresponding acknowledgement can extend to all alarms that contribute to the sum alarm, for example, to all the alarms assigned to a same category and to inferior plant levels that are evaluated by the sum alarm in question. In accordance with an exemplary embodiment, all of the alarms assigned to the same category do not need to be acknowledged individually by the operator.

For example, in an alarm interface of an SA system, the sum alarms can be presented in a hierarchical and structured way, where the structure can be automatically derived from an IEC 61850 Substation Configuration Description SCD file as the formal configuration description of the SA system. In accordance with an exemplary embodiment, a generic alarm application configured with the IEC 61850 SCD file of the SA system and pre-defined as well as user-defined alarm categories can be executed as an application expert program, based on SCD external categorization rules. The SCD file can allow automatically subscribing to the needed online data of the substation either via a standard interface like an OPC server, or directly to the IEDs as an IEC 61850 client. The plant level assigned can be a substation hierarchy level out of (in hierarchically decreasing order) a Substation, Voltage, Bay, Primary Equipment, Sub-equipment level.

Classification can be largely determined by rule-based definition of categories using the inherent semantics contained in the IEC 61850 data model from standardized Logical Node (LN) classes and Data Object (DO) names of the Data Objects including the alarm information, as well as from primary equipment structure and type as contained in the Substation section of the SCD file. For example, by means of user-defined rules, project-specific categorization into customer-chosen types of functional structures may be arranged for during engineering of a specific SA project, for example, in order to reflect different preferences as far as the above-mentioned ambiguities are concerned.

In exemplary embodiments, the alarm can be represented by a DO of a LN instance, with the alarm status or value being coded or given by an updated value of the DO. The alarm can be assigned to the hierarchical level of the respective LN. However, if an alarm is represented by a DO of a LN relating to a property of a specific Intelligent Electronic Device IED which in turn hosts a plurality of LNs, the highest substation hierarchy level of the plurality of LNs can be assigned to this alarm. As a consequence, a protection IED locally in a bay can be allocated to the bay, while a bus bar protection IED across several bays can be allocated to the voltage level of the bus bar.

In accordance with an exemplary embodiment, the alarm hierarchy and the alarms in the different categories can be displayed to an operator in a tree or table view. Sum alarms can also be provided for graphical representation in an operator HMI, for example, for optical display in a single line overview picture, equipment picture or graphical room layout. A suitable alarm application can automatically generate all sum alarms at the appropriate plant levels and categories and provide the sum alarms online, over a communication network of the SA system, as signals to gateways or other IEDs for further access and evaluation without any additional configuration or engineering effort. The access can be enabled by means of a standard interface like OPC or as an IEC 61850 server providing CALH sum alarms as disclosed herein.

In an exemplary embodiment of the disclosure, and in order to simplify the further access or interfacing to sum alarm status data, a sum alarm can be defined via formal description terms as an instance of a CALH LN according to IEC 61850. Sum alarms or CALH LNs can be instantiated per category on every substation hierarchy level. Each instance can further be connected to the process single line diagram and integrated into the SCD file of the SA system as detailed in EP-A 2264967. Accordingly, the integrated SCD file with the sum alarm LNs includes automatically engineered control blocks and data set definitions that together define the data flow within the alarm application, for example, the communication links between the IED that hosts the sum alarm LNs and the IEDs hosting the LNs that comprise the basic alarm information.

The present disclosure can also relate to a computer program product including computer program code for controlling one or more processors of an IED adapted to be connected to an SA communication network and/or to host a sum alarm LN, for example, a computer program product including a non-transitory computer readable medium containing therein the computer program code.

Figure 2:
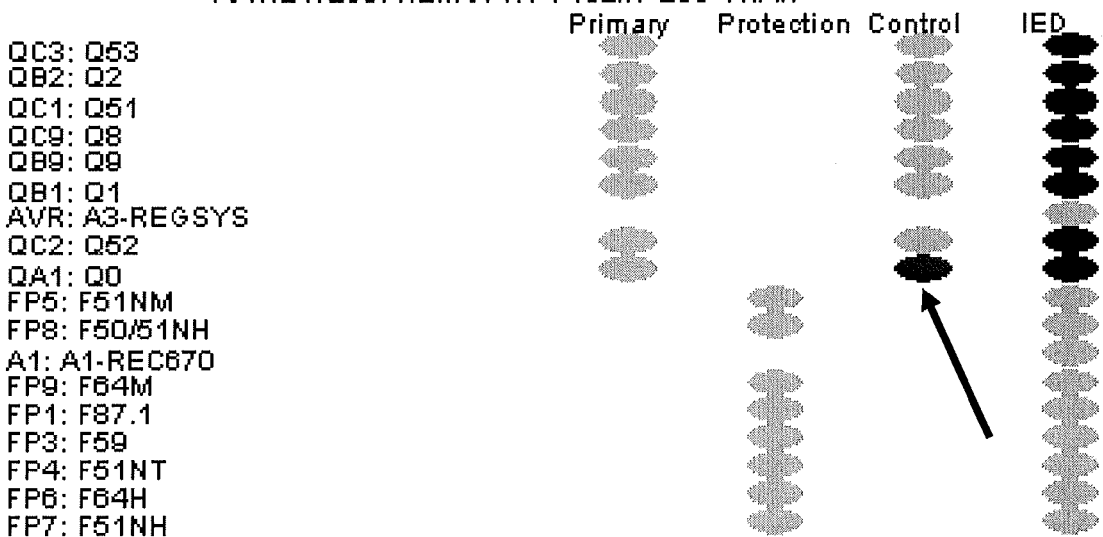
FIG. 2 shows an exemplary embodiment, wherein by clicking on one of the objects at the left side, for example, the bay Q05, the next level of the hierarchy containing primary equipment like switches and protection functions.
Figure 3:
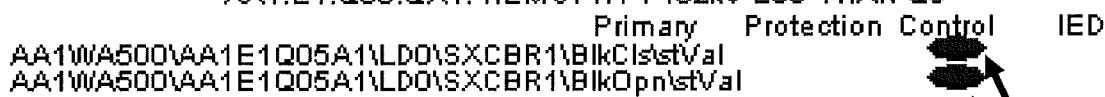
FIG. 3 shows two red circles denoted by an arrow, which shows an issue at the circuit breaker QA1 within this bay, and wherein selecting this object and then clicking the "control" category at the top, the appropriate signals in this level are shown, revealing that this breaker is blocked.

FIG. 1 depicts a table view of an exemplary alarm hierarchy view at voltage level AA1E1 showing the alarm state of the bays. The red circle denoted by an arrow indicates a control alarm in bay AA1E1Q05. By clicking on one of the objects at the left side, in this case the bay Q05, the next level of the hierarchy containing primary equipment like switches and protection functions is depicted in FIG. 2. The red circle denoted by an arrow shows that the problem or issue can be at the circuit breaker QA1 within this bay. By selecting this object and then clicking the "control" category at the top, the appropriate signals in this level are shown, revealing that this breaker can be blocked; compared to the two red circles denoted by arrows in FIG. 3.

FIG. 4 depicts an excerpt of an SCD file including the configuration part for the automatically generated application views depicted in FIG. 1, for example, the bay view for AA1E1Q05. For example, the circuit breaker QA1 as an exemplary primary or conducting equipment is listed. It includes a Logical Node XCBR, of which the Data Objects BlkCls and BlkOpn can be reported to have an active alarm status in FIG. 3

The hierarchy of the sum alarms in a SA system follows the SCD file substation hierarchy Substation/Voltage level/Bay/Primary Equipment/Sub-equipment. Additionally a Function/Subfunction hierarchy can be added at each level as needed, wherein a restriction coming from IEC 61850 concerns the fact that an alarm can only be allocated to a single substation hierarchy level. The categorization can be done by rules based on the inherent semantic of the IEC 61850 data model. Exemplary pre-defined rules for categorization can be:

Protection alarms: LN class starts with P and data item or DO name is Op or Tr or Blk or Health; LN class is RBRF and DO name is data Health, OpEx, OpIn.

Control alarms: LN classes are XCBR, XSWI, DO name is BlkOpn, BlkCls.

Primary equipment alarms: LN classes starting with X (switching device), Y (transformer), Z (other primary equipment), T (instrument transformer) and DO name EEHealth; LN classes SIMG, SIML and DO names EEHealth, InsAlm, PrsAlm; LN class is TVTR and DO name is FuFail; LN class MMXU or MMXN limit violations.

Secondary system (IED) alarms: any subscribed data item with q='invalid'; LN class LPHD, data names PhyHealth, WacTrg, WrmStr, PwrDwn, PwrUp.

Individual alarm states can be summed up or evaluated per category and across the hierarchy, according to some logic ensuring that the highest alarm state in terms of importance can prevail over all other contributing alarms. For example, on any change of an alarm value the state of all superior sum alarms in the category can be recalculated. For example, a generic, substation-level alarm application can be configured with the IEC 61850 SCD file of the SA system and preconfigured as well as user-defined alarm categories can be executed repeatedly during operation in order to propagate any base alarm status change without delay.

In addition to the standard IEC 61850 alarm states "OK" (green), "Warning" (yellow; applicable, for example, if a maximum number of switching operations is approached/reached, or if one out of two redundant communication channels is out of order), "Alarm" (red) an additional state "Not communicated" (black) is introduced, which can also represent an exemplary IED related alarm. In addition, the communication state of an IED can be derived from the quality of the signals exchanged. For example, in this case 'blue' means OK, but derived, while 'red' at the IED and 'black' at the signal shows a signal which has not been communicated. Alarm states of short duration like protection trips may also be handled, in which case a refined concept of alarm acknowledgement can be introduced, wherein an alarm stays pending until it is acknowledged AND its alarm state vanishes.

In an exemplary embodiment of the disclosure, the categories generated automatically respective by user defined rules could also be used to classify and filter, but not to graphically represent, events of an (archived) event list instead of the current alarm state.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of generating a sum alarm for alarms of a process control system for an industrial plant, the method comprising:
    identifying alarms described by a configuration description for the industrial plant;
    assigning each identified alarm to a plant level;
    assigning each identified alarm to an alarm category based on an alarm type retrieved from the configuration description; and
    deriving a sum alarm per alarm category and at a selected plant level from all alarms assigned to the alarm category and assigned to the selected plant level or to any plant level below.

2. The method according to claim 1, wherein the alarm category assigned is one of a protection, control, primary equipment, secondary equipment, or security category.

3. The method according to claim 1, comprising:
    defining a sum alarm acknowledgement for acknowledging all alarms contributing to a sum alarm.

4. The method according to claim 1, wherein the industrial plant is a substation of an electrical power transmission system described by a standardized configuration description according to IEC 61850.

5. The method according to claim 4, wherein the plant level assigned is a substation hierarchy level is one of a Substation, Voltage, Bay, Primary Equipment, Sub-equipment level.

6. The method according to claim 5, wherein the alarm is represented by a Data Object (DO) of a Logical Node (LN) according to IEC 61850, comprising:
    assigning the alarm to the substation hierarchy level of the LN; and
    assigning the alarm to an alarm category based on a name of the DO.

7. The method according to claim 5, wherein the alarm is an alarm related to an Intelligent Electronic Device (IED) hosting a plurality of implemented LNs, the method comprising:
    assigning the IED related alarm to a highest substation hierarchy level to which any one of the implemented LNs is assigned.

8. The method according to claim 5, comprising:
instantiating a sum alarm LN for each category and substation hierarchy level.

9. A sum alarm server of a Process Control (PC) system, wherein the sum alarm server is configured to:
identify alarms described by a configuration description for an industrial plant;
assign each identified alarm to a plant level;
assign each identified alarm to an alarm category based on an alarm type retrieved from the configuration description; and
derive a sum alarm per alarm category and at a selected plant level from all alarms assigned to the alarm category and assigned to the selected plant level or to any plant level below.

10. The sum alarm server according to claim 9, wherein the alarm category assigned is one of a protection, control, primary equipment, secondary equipment, or security category.

11. The sum alarm server according to claim 9, comprising:
defining a sum alarm acknowledgement for acknowledging all alarms contributing to a sum alarm.

12. The sum alarm server according to claim 9, wherein the industrial plant is a substation of an electrical power transmission system described by a standardized configuration description according to IEC 61850.

13. The sum alarm server according to claim 12, wherein the plant level assigned is a substation hierarchy level is one of a Substation, Voltage, Bay, Primary Equipment, Sub-equipment level.

14. The sum alarm server according to claim 13, wherein the alarm is represented by a Data Object (DO) of a Logical Node (LN) according to IEC 61850, comprising:
assigning the alarm to the substation hierarchy level of the LN; and
assigning the alarm to an alarm category based on a name of the DO.

15. The sum alarm server according to claim 14, wherein the alarm is an alarm related to an Intelligent Electronic Device (IED) hosting a plurality of implemented LNs, further comprising:
assigning the IED related alarm to a highest substation hierarchy level to which any one of the implemented LNs is assigned.

16. The sum alarm server according to claim 14, comprising:
instantiating a sum alarm LN for each category and substation hierarchy level.

17. The sum alarm server according to claim 9, comprising:
a Human Machine Interface (HMI), wherein the HMI is configured for optical access by an operator.

18. The sum alarm server according to claim 9, wherein the sum alarm server is configured for online access by a sum alarm client device.

19. The sum alarm server according to claim 9, wherein the sum alarm server is configured to be connected to a communication network of a Substation Automation (SA) system.

20. The sum alarm server according to claim 9, wherein the sum alarm server is configured to host a sum alarm Logical Node (LN) according to IEC 61850 for the generated sum alarm.

* * * * *